Figure 1:
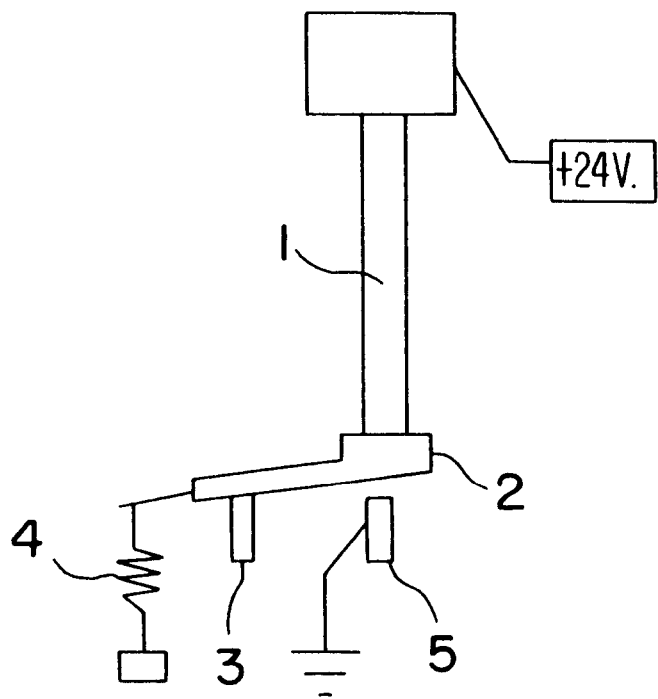

United States Patent
Tricarico et al.

[11] Patent Number: 6,072,143
[45] Date of Patent: Jun. 6, 2000

[54] MEASURING DEVICE AND METHOD FOR DETERMINING THE LENGTH OF AN ELECTRODE

[75] Inventors: Claudio Tricarico, Nyon, Switzerland; Bernard Forel, Thoiry; Eric Orhant, St. Jeoire en Faucigny, both of France

[73] Assignee: Charmilles Technologies S.A., Meyrin, Switzerland

[21] Appl. No.: 09/149,184

[22] Filed: Sep. 8, 1998

[30] Foreign Application Priority Data

Sep. 9, 1997 [CH] Switzerland ............................ 2120/97

[51] Int. Cl.[7] .................................................... B23H 7/18
[52] U.S. Cl. ................................................. 219/69.16
[58] Field of Search .......................... 219/69.16, 69.13, 219/69.2

[56] References Cited

U.S. PATENT DOCUMENTS

| | | | |
|---|---|---|---|
| 3,609,279 | 9/1971 | Giesbrecht | ............................ 219/69.16 |
| 3,973,104 | 8/1976 | Ullmann et al. | . |
| 4,049,942 | 9/1977 | Balleys et al. | . |
| 4,335,294 | 6/1982 | Inoue | . |
| 4,345,131 | 8/1982 | Semon et al. | . |
| 4,510,364 | 4/1985 | Ito | . |
| 4,700,038 | 10/1987 | Dauw | . |
| 4,798,929 | 1/1989 | Itoh | . |
| 5,115,112 | 5/1992 | Fitz, III et al. | ......................... 219/69.2 |
| 5,852,268 | 12/1998 | Buhler et al. | . |

FOREIGN PATENT DOCUMENTS

| | | | |
|---|---|---|---|
| 56-119322 | 9/1981 | Japan | .................................. 219/69.16 |
| 58-211828 | 12/1983 | Japan | .................................. 219/69.16 |

*Primary Examiner*—Geoffrey S. Evans
*Attorney, Agent, or Firm*—Burns, Doane, Swecker & Mathis, L.L.P.

[57] ABSTRACT

The invention proposes a method for determining the actual length of an electrode in an electrical discharge forming machine, wherein the electrode is brought in contact with a contact element. An electric short circuit is triggered at a trigger point during the additional movement of the electrode toward the contact element such that the position of the free electrode end is determined due to the known position of the trigger point. The machine control determines the length of the electrode that protrudes from the electrode holder from the position of the electrode holder and the position of the trigger point.

19 Claims, 2 Drawing Sheets

MEASURING DEVICE AND METHOD FOR DETERMINING THE LENGTH OF AN ELECTRODE

The invention pertains to a method for determining the length of an electrode in an electrical discharge forming machine while the processing is carried out as well as a measuring device for implementing said method.

When processing a work piece in accordance with the electrical discharge milling principle, in which tubular electrodes are guided along a controlled path, the removal of material from the work piece is associated with an intense wear of the electrode which can result in a shortening of said electrode. In this case, it is important to know the precise length of the electrode while the processing is carried out in order to replace the electrode in timely fashion or to correct the path control that moves the electrode along the controlled path.

Conventional electrical discharge forming machines, in particular, cavity sinking electrical discharge machines, for processing work pieces in a dielectric bath are equipped with devices that make it possible to position a new electrode opposite to the work piece or a measuring sphere that serves as a reference point before the processing begins. According to U.S. Pat. No. 4,039,779, a defined voltage of typically 24 V is applied between the electrode and the work piece/reference point, and the electrode is slowly moved toward the work piece/reference point. During the movement toward the work piece/reference point, an electrical discharge, a so-called short circuit or electric contact, already takes place before a mechanical contact occurs, namely once a certain distance between the electrode and the work piece/reference point, i.e., the so-called trigger point, is reached. This electrical discharge is detected by an electric circuit, and the relative distance between the electrode and the work piece or reference point is determined in this instant. If an oblong electrode is moved toward the work piece or reference point in the longitudinal direction, the length of the electrode can be obtained from the known coordinates of the electrode holder and the trigger point in the instant in which the short circuit is detected. Due to this electrical measurement, mechanical collisions which could lead to a deformation of the electrode or the work piece are prevented.

However, this type of measurement requires that no impurities which could lead to a premature short circuit and falsify the position measurement are situated in the space between the electrode and the work piece or reference point. Metallic particles that were removed from the work piece and are suspended in the dielectric fluid or coatings situated on the surface of the work piece or the electrode cause the discharge to be triggered at a distance that is greater than the normally expected distance. The measuring error usually lies between 5 times and 10 times the size of the largest particle situated in the intermediate space. Consequently, such position measurements can only be carried out with new electrodes and work pieces or electrodes and work pieces that were previously cleaned. In addition, no dielectric fluid should be situated in the aforementioned intermediate space because this fluid could also contain impurities.

An automation of this measuring principle according to the state of the art is not possible due to the required manual cleaning of the electrode and the work piece. Consequently a purely mechanical measurement is also unsuitable. Optical measuring methods also require a manual cleaning.

The present invention is based on the objective of developing a method that makes it possible to determine the length of an electrode which is clamped in the holder of an erosion machine, namely in such a way that the manual cleaning of the electrode and the reference point for carrying out the measurement is no longer necessary, wherein the usually provided detection of a short circuit can still be utilized. The method should be simple, and it should be possible to carry out said method in automated fashion. Another objective of the invention pertains to the development of a device that makes it possible to implement the aforementioned method.

In accordance with exemplary embodiments of the invention, a method for determining an actual length of a first electrode in an electrical discharge forming machine includes bringing the first electrode into contact with a contact element, and then moving the first electrode and the contact element toward a contact electrode. An electric short circuit is triggered at a trigger point during movement of the first electrode and the contact element toward the contact electrode, so that the position of the free end of the first electrode is determined due to a known position of the trigger point. The machine control determines the length of the first electrode that protrudes from the electrode holder, based on known positions of the electrode holder and the trigger point.

Preferred embodiments of the invention are described in detail below with reference to the enclosed figures.

Figure 2:
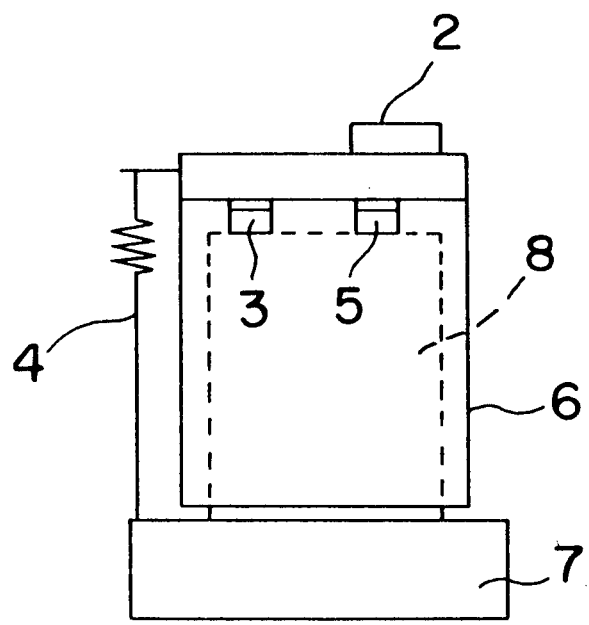
Figure 3:
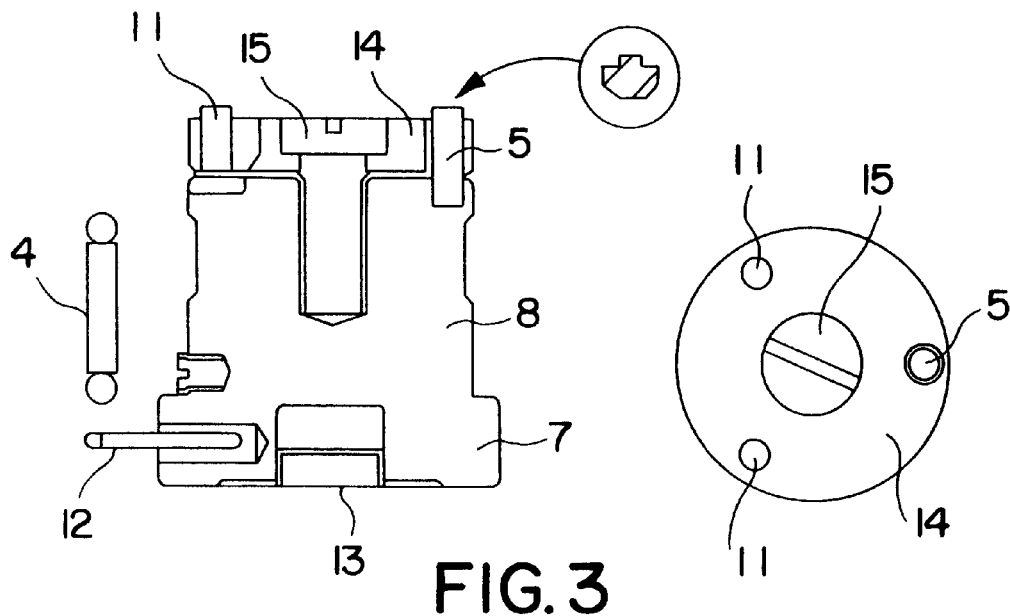
Figure 4:
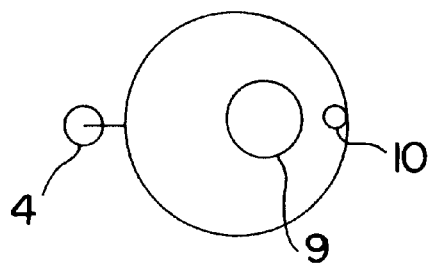

The figures show:

FIG. 1, a schematic representation of the measuring device;

FIG. 2, a side view of the measuring device and the protective container;

FIG. 3, a longitudinal section and a top view of one embodiment;

FIG. 4, a top view of a measuring device with two contact surfaces, and

FIG. 5, a schematic representation that serves for elucidating the measuring error caused by impurities.

In FIG. 1, a voltage (in this case 24 V) is applied to an electrode 1 of a not shown electrical discharge forming machine. This electrode 1 can be brought in mechanical contact with a contact element 2 that lies on a pivoted bearing 3. A spring 4 that is arranged on the contact element 2 and on an electrically insulated spring suspension 12 (in FIG. 2) prevents the contact element 2 from contacting the contact electrode 5 that is connected to the ground of the not shown electrical discharge forming machine. If the electrode 1 is moved toward the contact element 2, a mechanical contact occurs, wherein an electrical contact between the electrode and the contact element is also produced. The additional movement of the electrode toward the contact element requires a low mechanical force for compensating the tensile force of the spring. During this process, the contact element approaches the contact electrode, and the previously described electric short circuit occurs between the side of the contact element which faces away from the electrode (and is protected from impurities) and the contact electrode. The length of the electrode can be obtained from the known coordinates of the electrode holder and the trigger point of the measuring device in the instant of the detected short circuit, wherein the length of the electrode is calculated thereof by the machine control.

The machine control is able to calculate the wear of the electrode from the difference in the lengths of the electrode which is measured at different times, wherein the machine control carries out corresponding corrections of the path movement of the electrode or initiates the exchange of the electrode.

The force required for the measurement is preferably chosen between 250 and 300 g for tools that have a diameter between 1 mm and 12 mm. At this value, the interference effect caused by impurities in the measuring zone is largely eliminated as shown in FIG. 5. For electrodes with another diameter or electrodes that consist of another material, a spring with a corresponding force is used.

Figure 5A:
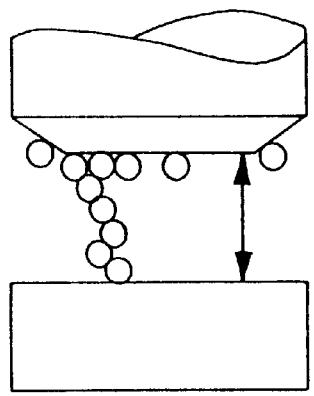
Figure 5B:
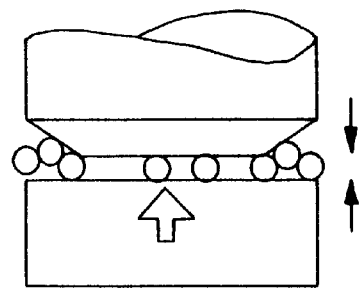

Without a cleaning process or without the removal of the dielectric fluid, a measuring error of approximately 0.12 mm can easily occur with a conventional measuring device according to the state of the art, i.e., the measuring device shown in FIG. 5a, if the particles have a maximum diameter of 20 μm. This measuring error occurs because several particles may be arranged in a row within the electric field. FIG. 5b shows that the measuring error can be reduced to approximately 0.015 mm without requiring a cleaning of the electrode.

FIG. 2 shows that a protective cap 6 of a nonconductive material, e.g., plexiglass, is provided for protecting the electric contact 5 and the side of the contact element 2 which faces the electric contact from impurities in the form of removed particles. This protective cap encompasses the contact element 2 and follows its pivoting movement.

In another variation, a complete encapsulation of the contact electrode and the side of the contact element which faces the contact electrode is realized in the form of a not shown elastic tubular seal that serves as a protection from impurities. This tubular seal is also tightly mounted on the base 7 of the body 8 of the measuring device. Consequently, the admission of dielectric fluid and removed particles into the region of the electric contact is prevented. This means that the measuring device may be entirely surrounded by the dielectric fluid, i.e., the length of an electrode immersed into the dielectric fluid can be determined.

In the embodiment shown in FIG. 3, the pivoting axis is realized in the form of two projections 11, on which lies the contact element 2 of steel. The projections 11 are embedded in a plate 14 and electrically insulated from the body 8. The contact electrode 5 is embedded in the plate 14 and also realized in the form of a projection, wherein the contact electrode is situated on the central vertical line of the projections 11, electrically insulated from said projections and in electrical contact with the body 8. The plate 14 is connected to the body 8 by means of a screw 15 that is not electrically conductive. The lower spring suspension 12 is electrically insulated from the body 8. In order to achieve a flexible installation within the work region of an electrical discharge forming machine, a magnet 13 is embedded into the base of the body 8.

FIG. 4 shows a variation that allows the measurement of two groups of electrodes of very different diameter with only one measuring device, namely without having to exchange the spring 4. When using larger electrode diameters (with the contact surface A), a higher force F is required for generating the pressure (p=F/A) required for reducing the measuring error by compressing or pressing away the impurities. Due to the different lever arm of the two contact surfaces 9 and 10 arranged on the contact element, two correspondingly different force ranges are attained.

The utilization of such a measuring device is not limited to the length measurement of the electrode during electrical discharge milling. The method according to the invention may, in particular, be utilized in the classical cavity sinking electrical discharge method, wherein measurements can be carried out in the dielectric fluid without requiring a time-consuming and complicated draining of the fluid from the work region and without requiring a manual cleaning of the electrode.

We claim:

1. Process for measuring the present length of an electrode in an electric discharge machine, wherein:

in a first step the electrode mounted in an electrode support is brought into contact with a contact element;

in a second step an electrical short circuit is triggered by further approach of the contact element and the electrode in contact therewith toward a contact electrode at a trigger point, whereby with the aid of the known position of the trigger point the position of the free end of the electrode is determined; and in a third step the machine control determines the length of the electrode projecting out from the electrode support from the positions of the electrode support and that of the trigger point; and the measurement is performed in a protective cap encircling the contact element so that performance of the measurement is possible without cleaning the electrode and the workpiece and without removing a dielectric liquid.

2. Process according to claim 1, wherein wear during processing is determined by the machine control based on the repeated measurement of the length of the electrode.

3. Process according to claim 1, wherein the measured length and a determined wear of the electrode are used for the automatic correction of the continuous-path control for the electrode by the machine control during the processing operation.

4. Process according to claim 1, wherein an exchange of the electrode is induced on undershoot or overshoot of a value, given by the path control, for the length measured or the wear of the electrode.

5. Measuring apparatus for the implementation of the process according to claim 1, wherein the contact element is a) movably situated for the production of a mechanical and electrical contact with the electrode to be measured, b) is held at a definite distance from the contact electrode, and c) can be pushed toward the contact electrode and brought into contact with the contact electrode.

6. Measuring apparatus according to claim 5, wherein the force acting on the contact element can be varied.

7. Process for measuring the present length of an electrode in an electric discharge machine, wherein:

in a first step the electrode mounted in an electrode support is brought into contact with a contact element;

in a second step an electrical short circuit is triggered by further approach of the contact element and the electrode in contact therewith toward a contact electrode at a trigger point, whereby with the aid of the known position of the trigger point the position of the free end of the electrode is determined; and in a third step the machine control determines the length of the electrode projecting out from the electrode support from the positions of the electrode support and that of the trigger point;

the contact element is movably situated for the production of a mechanical and electrical contact with the electrode to be measured;

the contact element has a first contact face for contacting the electrode to produce the mechanical and electrical contact with the electrode and a second contact face electrically connected to the first contact face; and the contact element is held at a designed distance from the contact electrode by a force acting thereon and can be brought into electrical contact with the contact electrode via the second contact face by an external opposing force.

8. Process according to claim 7, wherein wear during processing is determined by the machine control based on the repeated measurement of the length of the electrode.

9. Process according to claim 7, wherein the measured length and a determined wear of the electrode are used for the automatic correction of the continuous-path control for the electrode by the machine control during the processing operation.

10. Process according to claim 7, wherein an exchange of the electrode is induced on undershoot or overshoot of a value, given by the path control, for the length measured or the wear of the electrode.

11. Process for measuring the present length of an electrode in an electric discharge machine, wherein:

in a first step the electrode mounted in an electrode support is brought into contact with a contact element;

in a second step an electrical short circuit is triggered by further approach of the contact element and the electrode in contact therewith toward a contact electrode at a trigger point, whereby with the aid of the known position of the trigger point the position of the free end of the electrode is determined, and in a third step the machine control determines the length of the electrode projecting out from the electrode support from the positions of the electrode support and that of the trigger point;

the contact element a) is movably situated for the production of a mechanical and electrical contact with the electrode to be measured, b) is held at a definite distance from the contact electrode, c) can be pushed toward the contact electrode and brought into contact with the contact electrode; and the electrical contact between the contact element and the contact electrode takes place in an area protected against impurities.

12. The apparatus of claim 11, wherein the area protected against impurities is located within a protective cap encircling the contact element.

13. Process according to claim 11, wherein wear during processing is determined by the machine control based on the repeated measurement of the length of the electrode.

14. Process according to claim 11, wherein the measured length and a determined wear of the electrode are used for the automatic correction of the continuous-path control for the electrode by the machine control during the processing operation.

15. Process according to claim 11, wherein an exchange of the electrode is induced on undershoot or overshoot of a value, given by the path control, for the length measured or the wear of the electrode.

16. Process for measuring the present length of an electrode in an electric discharge machine, wherein:

in a first step the electrode mounted in an electrode support is brought into contact with a contact element;

in a second step an electrical short circuit is triggered by further approach of the contact element and the electrode in contact therewith toward a contact electrode at a trigger point, whereby with the aid of the known position of the trigger point the position of the free end of the electrode is determined; and in a third step the machine control determines the length of the electrode projecting out from the electrode support from the positions of the electrode support and that of the trigger point;

the contact element is movably situated for the production of a mechanical and electrical contact with the electrode to be measured; and the contact element has several contact faces on which different strong forces act.

17. Process according to claim 16, wherein an exchange of the electrode is induced on undershoot or overshoot of a value, given by the path control, for the length measured or the wear of the electrode.

18. Process according to claim 16, wherein wear during processing is determined by the machine control based on the repeated measurement of the length of the electrode.

19. Process according to claim 16, wherein the measured length and a determined wear of the electrode are used for the automatic correction of the continuous-path control for the electrode by the machine control during the processing operation.

* * * * *